(12) United States Patent
Brennan, Jr.

(10) Patent No.: US 6,729,098 B1
(45) Date of Patent: May 4, 2004

(54) ADJUSTABLE HEIGHT CORNER FITTING

(76) Inventor: James F. Brennan, Jr., 876 Land St., East Riverton, NJ (US) 08077

( * ) Notice: Subject to any disclaimer, the term of this patent is extended or adjusted under 35 U.S.C. 154(b) by 0 days.

(21) Appl. No.: 10/201,330

(22) Filed: Jul. 23, 2002

(51) Int. Cl.[7] .................................................. B60P 7/13
(52) U.S. Cl. ...................... 52/700; 52/655.1; 52/592.6; 24/287; 410/35
(58) Field of Search ............................ 52/656.9, 655.1, 52/700, 79.9, 592.6; 248/188.8, 188.9, 677; 220/1.5; 24/287; 410/71, 35, 82, 83

(56) References Cited

U.S. PATENT DOCUMENTS

| | | | |
|---|---|---|---|
| 3,722,714 A | * 3/1973 | Morris et al. .................. | 410/85 |
| 3,752,511 A | * 8/1973 | Racy ............................ | 24/287 |
| 4,271,654 A | * 6/1981 | Jungbluth ..................... | 52/637 |
| 4,741,449 A | * 5/1988 | Bersani ........................ | 220/1.5 |
| 4,836,395 A | * 6/1989 | Goutille ....................... | 220/1.5 |
| 4,914,873 A | * 4/1990 | Newhouse .................... | 52/36.1 |
| 5,190,179 A | * 3/1993 | Richter et al. ................. | 220/6 |
| 5,678,375 A | * 10/1997 | Juola ........................... | 52/655.1 |
| 5,847,537 A | * 12/1998 | Parmley, Sr. ................. | 52/79.1 |
| 6,364,584 B1 | * 4/2002 | Taylor .......................... | 410/94 |
| 2002/0162296 A1 | * 11/2002 | Fernandez Marin ........ | 52/726.3 |

* cited by examiner

*Primary Examiner*—Brian E. Glessner
(74) *Attorney, Agent, or Firm*—Norman E. Lehrer

(57) ABSTRACT

An adjustable height corner fitting for a shipping container including a substantially hollow rectangularly shaped block having a bottom wall, end walls and side walls is disclosed. An elongated aperture is located in the bottom wall and is adapted to cooperate with a locking mechanism in order to lock the shipping container to the platform of a vehicle. Also provided is a substantially rectangularly shaped plate that is complementary to the bottom wall and is adapted to be temporarily attached thereto in order to increase the height of the block. The plate also has an elongated aperture therein which is complementary to the aperture in the bottom wall. When the plate is attached, the apertures in the plate and in the bottom wall are in alignment, but the plate causes the corner fitting to extend downwardly approximately a half an inch below the container for shipment on a truck, boat or rail car. With the plate removed, the bottom of the corner fitting is essentially flush with the bottom of the container thereby allowing the container to be transported by cargo plane.

15 Claims, 2 Drawing Sheets

ADJUSTABLE HEIGHT CORNER FITTING

BACKGROUND OF THE INVENTION

The present invention is directed toward an improved corner fitting and, more particularly, to such an improved corner fitting that allows the height of the same to be adjusted so as to be useful for a variety of purposes.

In order to utilize various modes of transportation, shipping containers typically use a system of standard corner fittings that allows them to be safely affixed to their support platform. For a shipping container to be carried by truck, rail or ship it must comply with I.S.O. Standards promulgated by the International Standards Organization. Typically the shipping containers are affixed by means of a quick lock mechanism which secures the shipping container to the support platform at the lower four corner fittings. These four points are located on the lower planar surface of the container at the respective ends of the container. The fitting is a cube embedded, usually affixed by welding, in each corner of the container with three sides exposed to the exterior of the container.

The average fitting is hollow and has a hole in each of the three sides to receive a fastener for attaching the container to a support platform, which may be part of a vehicle such as a truck chassis, a train flatbed or the deck or hold of a ship. The holes in the fitting are typically shaped like an oval with two flat sides thus having a long axis and a short axis.

A commonly used fastener for securing the container is described, for example, in U.S. Pat. No. 2,963,310 to Abolins. Abolins shows a twist-lock type locking system that has a head shaped complementary to the hole in the fitting. The head is attached to the end of a narrow neck that is rotatably affixed to the support platform. The head is inserted into the fitting hole and then the neck is rotated. This twists the head so that its long dimension overlaps the short axis of the hole, thereby preventing it from being removed and securing it to the fitting.

By regulation, the bottom plane of each of the lower corner fittings extends downwardly approximately a half an inch below the lower surface of the bottom of the main portion of the shipping container. As a result, when one container is stacked on top of another, the lower corner fittings of the top container rest on and are supported by the upper corner fittings of the bottom container. This prevents the main body portions of the containers from contacting each other which could cause damage to them.

Shipping containers with conventional corner fittings as described above have been successfully used for many years on ships, rail cars, trucks and the like. Similar shipping containers have also been used on aircraft. Conventional corner fittings, however, have created a problem in such applications.

Most aircraft used for transporting shipping containers utilize a series of rollers that allow the container to be rolled into and out of the cargo hold of the plane. To function properly, this roller system requires that the bottom of the container be substantially flat or at least have no protrusions extending downwardly therefrom. Downward protrusions can interfere with or damage the roller system of the aircraft. As a result conventional shipping containers with corner fittings that extend downwardly even a half an inch can not be used. Rather, special shipping containers must be utilized or conventional shipping containers must first be lifted onto an aircraft pallet which has a substantially flat bottom surface.

This, of course, creates a problem when it is desired to use the same shipping container with a cargo plane and some other form of transportation. That is, a shipping container being brought to a plane by truck cannot be rolled directly onto the plane. Similarly, a container rolled off of a plane cannot be placed directly onto a truck as the corner fittings do not extend downwardly as required. In both cases, the goods or equipment within the container must be transferred into a different container to accommodate the different form of transportation. To Applicants' knowledge, there is no shipping container currently available that can be properly and directly used with a cargo plane and with other forms of transportation.

SUMMARY OF THE INVENTION

The present invention is designed to overcome the deficiencies of the prior art discussed above. It is an object of this invention to provide a corner fitting that is secured to a shipping container and which can easily and quickly be modified to allow the container to be transported by cargo plane or any other conventional form of transportation.

It is another object of the invention to provide a corner fitting which can easily and quickly be modified to allow the container to be transported by cargo plane or any other conventional form of transportation and which complies the I.S.O. standards set forth by the International Standards Organization.

It is a further object of this invention to provide a corner fitting that can easily be modified to either extend a half inch or so below the lower surface of the container or to be essentially flush with the lower surface.

In accordance with the illustrative embodiments, demonstrating features and advantages of the present invention, there is provided an improved adjustable height corner fitting for a shipping container. The fitting is comprised of a substantially hollow rectangularly shaped block having a bottom wall, end walls and side walls. An elongated aperture is located in the bottom wall and is adapted to cooperate with a locking mechanism in order to lock the shipping container to the platform of a vehicle. Also provided is a substantially rectangularly shaped plate that is complimentary to the bottom wall and is adapted to be temporarily attached thereto in order to increase the height of the block. The plate also has an elongated aperture therein which is complimentary to the aperture in the bottom wall. When the plate is attached, the apertures in the plate and in the bottom wall are in alignment, but the plate causes the corner fitting to extend downwardly approximately a half an inch below the container for shipment on a truck, ship or rail car. With the plate removed, the bottom of the corner fitting is essentially flush with the bottom of the container thereby allowing the container to be transported by cargo plane.

Other objects, features and advantages of the invention will be readily apparent from the following detailed description of a preferred embodiment thereof taken in conjunction with the drawings

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a side elevational view of a shipping container using the corner fitting of the present invention arranged to be used for shipping on a truck, ship, rail car or the like;

DETAILED DESCRIPTION OF THE PREFERRED EMBODIMENT

Figure 4:
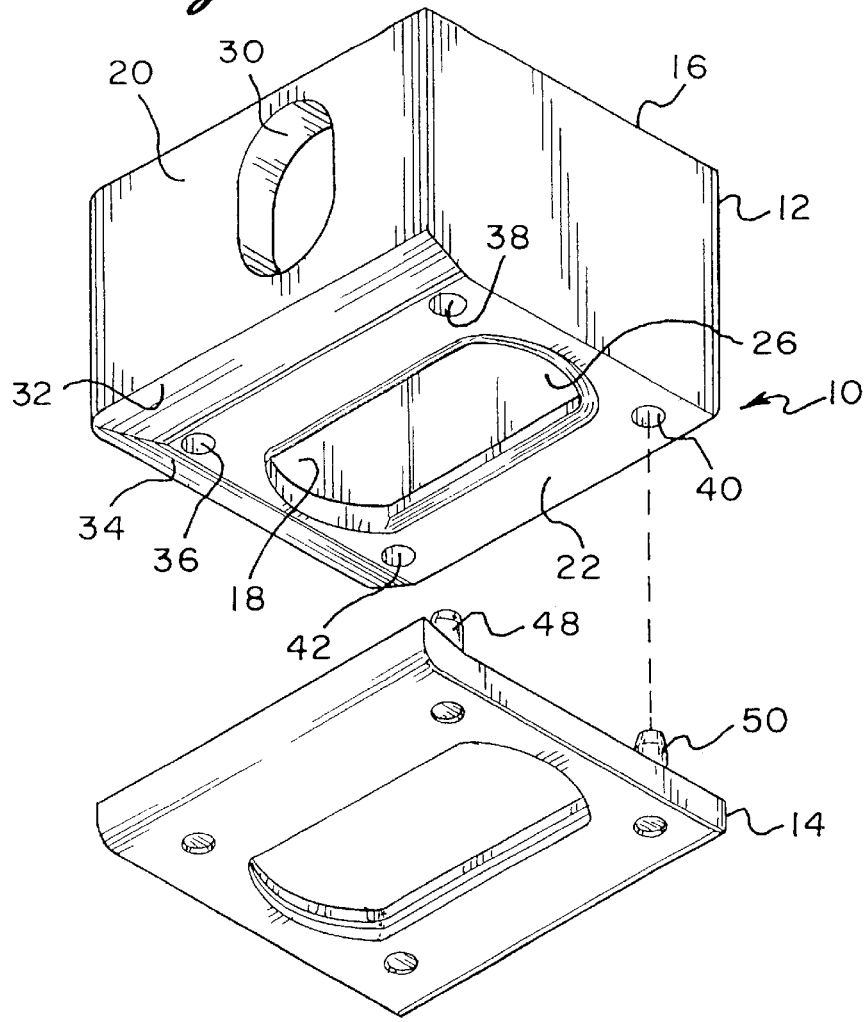
FIG. 4 is an exploded view of a corner fitting of the present invention illustrating the details thereof.

Referring now to the drawings in detail wherein like reference numerals have been used throughout the various figures to designate like elements, there is shown in FIG. 4 a corner fitting constructed in accordance with the principles of the present invention and designated generally as 10. The corner fitting 10 is comprised essentially of two parts: a substantially rectangularly shaped hollow block 12 and a bottom plate 14 that is removably secured thereto.

Figure 1:
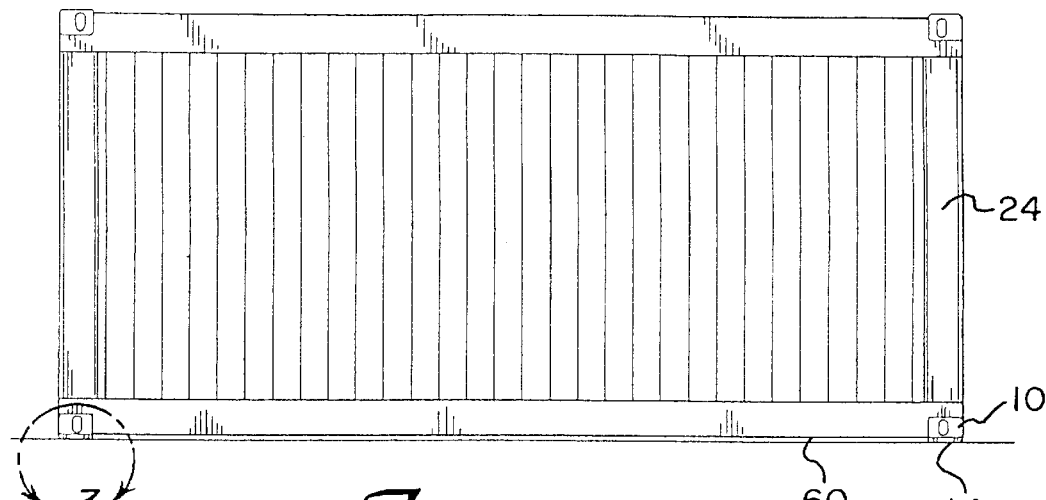
Figure 2:
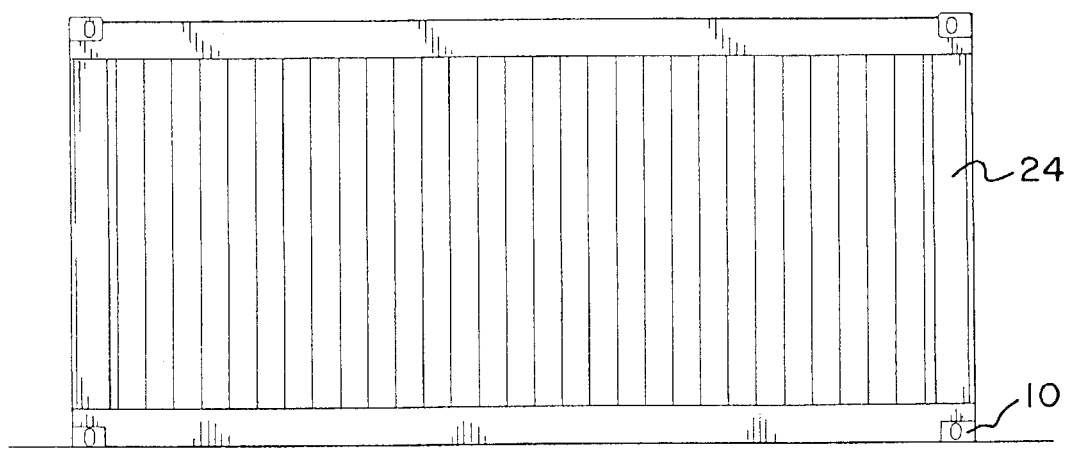
FIG. 2 is a view similar to FIG. 1 with the corner fitting of the present invention arranged to be used for shipping on a cargo plane.
Figure 3:
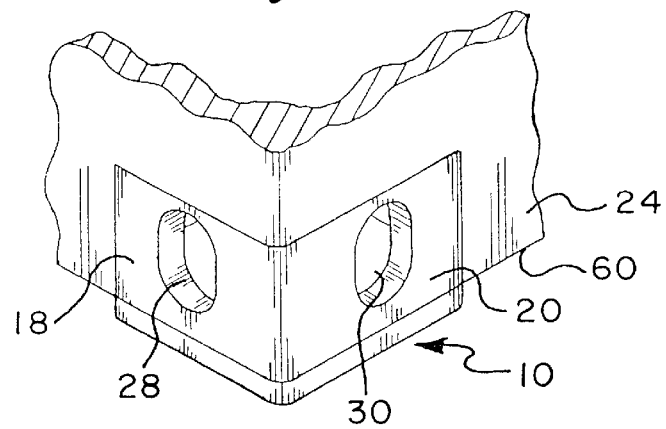
FIG. 3 is a perspective cut away view of the corner fitting secured to a shipping container.

The block 12 is, in many ways, similar to a conventional corner fitting in that it includes a top 16 (which may be open or closed), at least one side wall 18, at least one end wall 20 and a bottom wall 22. The block 12 is permanently secured to the corner of a shipping container 24 as shown in FIGS. 1, 2 and 3 which is to be temporarily locked onto the platform of a tractor trailer, rail car or ship. As with conventional corner fittings known in the art, an elongated opening or aperture 26 is formed in the bottom wall 22 of the block 12 and circular or elongated openings 28 and 30 are formed in the side and end walls 18 and 20, respectively.

As best shown in FIG. 4, a chamfer area or rounded edge 32 is formed between the area where the bottom wall 22 and end wall 20 intersect. Similarly, a chamfered area 34 is formed at the intersection between the bottom wall 22 and the side wall 18. The bottom wall 22 also includes four holes 36, 38, 40 and 42 that pass through from the bottom exterior surface of the block 12 to the interior thereof.

Figure 5:
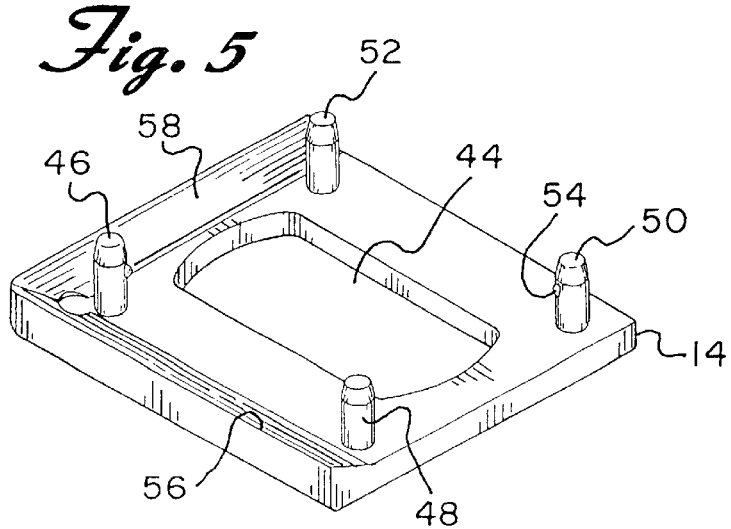
FIG. 5 is a top perspective view of the bottom plate that forms a part of the corner fitting of the invention.

The bottom plate 14, as best shown in FIGS. 4 and 5, is also substantially rectangularly shaped and is complimentary to the bottom wall 22 of the block 12. An elongated aperture 44 is formed in the center of the plate 14 and is complimentary to the aperture 26 formed in the bottom wall 22. Extending upwardly from the top surface of the plate 14 are a plurality of projections in the form of pins 46, 48, 50 and 52. Each of the pins is complimentary to and is adapted to pass through the respective openings 36, 38, 40 and 42 formed in the bottom wall 22 of the block 12. One or more of the pins may include spring loaded ball detents such as shown at 54 which will help to temporarily attach and hold the plate 14 in position at the bottom of the block 12 when desired.

As best shown in FIG. 5, the plate 14 also includes raise chamfered areas 56 and 58 that are complimentary to the areas 32 and 34 on the bottom surface of the block 22. That is, the upper surface of the plate 14 is essentially complimentary to the lower surface of the block 12.

The plate 14 is temporarily attached to the block 12 by simply pushing the plate into place with the pins 46, 48, 50 and 52 passing through the openings 36, 38, 40 and 42. The detent balls 54 will hold the plate in place and the aperture 44 will be in direct alignment with the aperture 26. In this configuration, the corner fitting 10 will resemble a conventional corner fitting with the thickness of the plate 14 extending approximately one half inch below the bottom surface 60 of the container 24 as shown in FIGS. 1 and 3. The shipping container can then be used in any conventional manner as is well known in the art.

When it is desired to load the shipping container 24 onto a cargo plane where the downward projection of the corner fittings may create a problem, all that is required is to remove the plate 14 from the block 12. This is accomplished by merely pulling the plate downwardly after the container has been raised. If necessary, a workman can insert his hand through one of the openings 28 or 30 or the apertures 44 and 26 to help push the pins downwardly or to release the detent balls 54 if the same becomes stuck. With the plate 14 removed, the bottom wall 22 of the block 12 is essentially flush with the bottom 60 of the container 24 as shown best in FIG. 2. The chamfer 32 at the leading end of the container bottom helps to guide the container over the rollers in the floor of the cargo plane.

The plates 14 that have been removed from the bottom of the blocks 12 can be shipped along with the shipping containers 24 on the cargo plane. When the containers are removed from the plane at the destination, the plates 14 can then be reassembled onto the bottom and the shipping containers can then be shipped on rail cars, trucks, ships or any other similar vehicles in a conventional manner.

The present invention may be embodied in other specific forms without departing from the spirit or essential attributes thereof and accordingly reference should be made to the appended claims rather than to the foregoing specification as indicating the scope of the invention.

What is claimed is:

1. An improved corner fitting for a shipping container comprising:

a hollow rectangular block having a bottom wall, at least one end wall and at least one side wall;

an elongated aperture located in said bottom wall adapted to cooperate with a locking mechanism in order to lock said shipping container to a platform of a vehicle, and a substantially rectangularly shaped plate complementary to said bottom wall and adapted to be attached thereto in order to increase the height of said block, said plate having a single elongated aperture therein complementary to said aperture in said bottom wall, said apertures being in alignment with each other when said plate is attached to said bottom wall, and means for temporarily attaching said plate to said bottom wall of said block.

2. The improved corner fitting as claimed in claim 1 wherein said means for temporarily attaching said plate to said bottom wall of said block includes said plate having a plurality of vertically extending projections and said bottom wall having a plurality of complementary holes adapted to receive said projections.

3. The improved corner fitting as claimed in claim 2 wherein said projections are in the form of upstanding pins.

4. The improved corner fitting as claimed in claim 3 further including means for temporarily preventing said pins from being removed from said holes when said plate is properly positioned on said bottom wall.

5. The improved corner fitting as claimed in claim 1 wherein said bottom wall and said end wall intersect each other and include a chamfered area at the intersection.

6. The improved corner fitting as claimed in claim 5 wherein said plate has an upper surface and includes a portion that is complementary to and is adapted to mate with said chamfered area of said bottom wall.

7. The improved corner fitting as claimed in claim 5 wherein said bottom wall and said side wall intersect each other and include a chamfered area at the intersection.

8. The improved corner fitting as claimed in claim 7 wherein said plate includes portions that are complementary to and are adapted to mate with both of said chamfered areas of said bottom wall.

9. An improved corner fitting for a shipping container comprising:
   a hollow rectangular block having a bottom wall, at least one end wall and at least one side wall;
   an elongated aperture located in said bottom wall adapted to cooperate with a locking mechanism in order to lock said shipping container to a platform of a vehicle, and
   a substantially rectangularly shaped plate complementary to said bottom wall and adapted to be attached thereto in order to increase the height of said block, said plate having an elongated aperture therein complementary to said aperture in said bottom wall, said apertures being in alignment with each other when said plate is attached to said bottom wall, and means for temporarily attaching said plate to said bottom wall of said block, said attaching means including said plate having a plurality of vertically extending projections and said bottom wall having a plurality of complementary holes adapted to receive said projections.

10. The improved corner fitting as claimed in claim 9 wherein said projections are in the form of upstanding pins.

11. The improved corner fitting as claimed in claim 10 further including means for temporarily preventing said pins from being removed from said holes when said plate is properly positioned on said bottom wall.

12. An improved corner fitting for a shipping container comprising:
   a hollow rectangular block having a bottom wall, at least one end wall and at least one side wall, said bottom wall and said end wall intersecting each other and including a chamfered area at the intersection;
   an elongated aperture located in said bottom wall adapted to cooperate with a locking mechanism in order to lock said shipping container to a platform of a vehicle, and
   a substantially rectangularly shaped plate complementary to said bottom wall and adapted to be attached thereto in order to increase the height of said block, said plate having an elongated aperture therein complementary to said aperture in said bottom wall, said apertures being in alignment with each other when said plate is attached to said bottom wall, and means for temporarily attaching said plate to said bottom wall of said block.

13. The improved corner fitting as claimed in claim 12 wherein said plate has an upper surface and includes a portion that is complementary to and is adapted to mate with said chamfered area of said bottom wall.

14. The improved corner fitting as claimed in claim 12 wherein said bottom wall and said side wall intersect each other and include a chamfered area at the intersection.

15. The improved corner fitting as claimed in claim 14 wherein said plate includes portions that are complementary to and are adapted to mate with both of said chamfered areas of said bottom wall.

\* \* \* \* \*